(12) United States Patent
Kim et al.

(10) Patent No.: US 11,233,308 B2
(45) Date of Patent: Jan. 25, 2022

(54) MULTIPLE-INPUT AND MULTIPLE-OUTPUT ANTENNA APPARTUS

(71) Applicant: KMW INC., Hwaseong-si (KR)

(72) Inventors: Duk Yong Kim, Yongin-si (KR); Jun Woo Yang, Hwaseong-si (KR); Jin Soo Yeo, Hwaseong-si (KR); Chang Woo Yoo, Hwaseong-si (KR); Min Sik Park, Hwaseong-si (KR); Hye Yeon Kim, Gangjin-gun (KR)

(73) Assignee: KMW INC., Hwaseong-si (KR)

( * ) Notice: Subject to any disclaimer, the term of this patent is extended or adjusted under 35 U.S.C. 154(b) by 0 days.

(21) Appl. No.: 16/892,275

(22) Filed: Jun. 3, 2020

(65) Prior Publication Data

US 2020/0295433 A1  Sep. 17, 2020

Related U.S. Application Data (63) Continuation of application No. PCT/KR2018/015242, filed on Dec. 4, 2018.

(30) Foreign Application Priority Data

Dec. 4, 2017 (KR) .................. 10-2017-0165352

(51) Int. Cl.
*H01Q 1/02* (2006.01)
*H01Q 1/42* (2006.01)
(Continued)

(52) U.S. Cl.
CPC ............. *H01Q 1/02* (2013.01); *H01Q 1/2283* (2013.01); *H01Q 1/405* (2013.01); *H01Q 1/42* (2013.01); *H04B 7/0413* (2013.01)

(58) Field of Classification Search
CPC ........ H01Q 1/02; H01Q 1/2283; H01Q 1/405; H01Q 1/246; H01Q 1/42; H01Q 21/065
See application file for complete search history.

(56) References Cited

U.S. PATENT DOCUMENTS

| | | | | |
|---|---|---|---|---|
| 2013/0222201 | A1* | 8/2013 | Ma | ........................... H01Q 1/02 343/834 |
| 2015/0372376 | A1* | 12/2015 | Le | ....................... H01Q 9/0407 370/338 |
| 2016/0380349 | A1* | 12/2016 | Elson | ....................... H01Q 3/02 343/872 |

FOREIGN PATENT DOCUMENTS

| | | |
|---|---|---|
| JP | 2004-039857 A | 2/2004 |
| JP | 2005-260237 A | 9/2005 |

(Continued)

OTHER PUBLICATIONS

International Search Report for PCT/KR2018/015242 dated Mar. 14, 2019 and its English translation.

*Primary Examiner* — Hoang V Nguyen (57) ABSTRACT

The present disclosure relates to a multiple-input and multiple-output antenna apparatus, and particularly, includes a housing, a ray dome which is coupled to the top of one side of the housing in a longitudinal direction, and has an antenna assembly disposed between the ray dome and the housing, a PCB assembly which is disposed at the bottom of the antenna assembly, a top cooling part which is coupled to the top of the other side of the housing in the longitudinal direction, has a battery and an FPGA assembly disposed between the top cooling part and the housing, and dissipates upward the heat discharged from the FPGA assembly, and a side cooling part which is coupled to protrude to one side in a width direction between the housing and the top cooling part and the other side in the width direction therebetween, and moves and dissipates the heat generated from the FPGA assembly to one side and the other side of the housing in the width direction, thereby improving cooling performance.

15 Claims, 6 Drawing Sheets

(51) Int. Cl.
*H01Q 1/22* (2006.01)
*H01Q 1/40* (2006.01)
*H04B 7/0413* (2017.01)

(56) References Cited

FOREIGN PATENT DOCUMENTS

| JP | 2017-063288 A | 3/2017 |
| KR | 10-1567363 B1 | 11/2015 |
| KR | 10-2016-0109507 A | 9/2016 |

\* cited by examiner

MULTIPLE-INPUT AND MULTIPLE-OUTPUT ANTENNA APPARTUS

CROSS-REFERENCE TO RELATED APPLICATIONS

This application is a Continuation of International Application No. PCT/KR2018/015242, filed on Dec. 4, 2018, which claims the benefit of and priority to Korean Patent Application No. 10-2017-0165352, filed on Dec. 4, 2017, the content of which are herein incorporated by reference in their entirety.

TECHNICAL FIELD

The present disclosure relates to a multiple-input and multiple-output antenna apparatus, and more particularly, to a multiple-input and multiple-output antenna apparatus capable of improving cooling performance.

BACKGROUND ART

A multiple-input and multiple-output (MIMO) technology is a technology of dramatically increasing data transmission capacity using a plurality of antennas, and is a spatial multiplexing technique in which a transmitter transmits different data through the respective transmission antennas, and a receiver identifies transmission data through an appropriate signal processing. Accordingly, by simultaneously increasing the number of transmission and reception antenna, the channel capacity may be increased to transmit more data. For example, when the number of antennas is increased to 10, the channel capacity about 10 times higher than that of a current single antenna system is secured using the same frequency band.

Up to 8 antennas are used in a 4G LTE-advanced, and products with 64 or 128 antennas are currently being developed in a pre-5G phase, and base station equipment with a much larger number of antennas is expected to be used in a 5G, which is called a Massive MIMO technology. While a current operation of a cell is a 2-Dimension, a 3D-Beamforming becomes possible when the Massive MIMO technology is introduced, such that the Massive MIMO technology is also called a Full Dimension MIMO (FD-MIMO).

However, if a large number of antennas described above are disposed in housing forming the appearance, a lot of heat may be generated from heat-generating elements such as electric elements and a plurality of FPGAs of a control PCB which is provided for processing the antennas.

Conventionally, a cooling part is provided with a plurality of cooling ribs which is provided in a space within the housing and is in direct contact with the aforementioned heat-generating element, and is configured to dissipate heat by exhausting the heat within the housing to the outside using a separate blowing fan, but this configuration has problems in that there is a limitation in a heat contact area of the cooling part with the heat-generating element, and the separate blowing fan for exhausting the heat within the housing needs to be provided.

This is a suitable method for a case where a single heat-generating element is provided, but in the case where a plurality of heat-generating elements exist such as the aforementioned MIMO antenna apparatus, internal cooling in a portion where the heat-generating element is fixed has limitations in improving cooling performance.

DISCLOSURE

Technical Problem

The present disclosure is intended to solve the above problems, and an object of the present disclosure is to provide a multiple-input and multiple-output antenna apparatus capable of improving cooling performance of the heat generated from a plurality of heat-generating elements.

Another object of the present disclosure is to provide a multiple-input and multiple-output antenna apparatus capable of quickly dissipating heat from a heat-generating place to the outside without applying a separate blowing fan.

Still another object of the present disclosure is to provide a multiple-input and multiple-output antenna apparatus capable of quickly transferring the heat inside a limited space to an external cooling part using a heat pipe group having good heat transfer efficiency.

Technical Solution

An exemplary embodiment of a multiple-input and multiple-output antenna apparatus according to the present disclosure includes a housing, a radome which is coupled to the top of one side of the housing in a longitudinal direction, and has an antenna assembly disposed between the radome and the housing, a PCB assembly which is disposed at the bottom of the antenna assembly, a top cooling part which is coupled to the top of the other side of the housing in the longitudinal direction, has a battery and an FPGA assembly disposed between the top cooling part and the housing, and dissipates upward the heat discharged from the FPGA assembly, and a side cooling part which is coupled to protrude to one side in a width direction between the housing and the top cooling part and the other side in the width direction therebetween, and moves and dissipates the heat generated from the FPGA assembly to one side and the other side of the housing in the width direction.

Here, the bottom surface of the housing may be provided with a plurality of bottom cooling ribs, which protrude at a predetermined length downward, are formed lengthily in the longitudinal direction of the housing, and are disposed to be spaced at a predetermined distance apart from each other in the width direction of the housing.

The radome serves to protect the antenna assembly installed on the top surface of the housing from the outside, and does not have a separate cooling part. Accordingly, the heat generated from a heat-generating element in a first installation space S1 is preferably provided so that the entire heat is dissipated to the outside through the bottom cooling rib of the housing.

Further, the top cooling part serves to protect the FPGA assembly provided in a second installation space S2 from the outside, and to dissipate some of the heat generated from the second installation space S2 to the outside.

More specifically, the top surface of the top cooling part may be provided with a plurality of top cooling ribs, which protrude at a predetermined length upward, are formed lengthily in the longitudinal direction of the housing, and are disposed to be spaced at a predetermined distance apart from each other in the width direction of the housing.

Meanwhile, the bottom surface of the top cooling part may have a heat transfer block, which is directly in surface contact with a plurality of unit heat-generating elements including an FPGA element and the like provided in the second installation space S2, may be formed to protrude downward from the bottom surface of the top cooling part so as to correspond to the plurality of unit heat-generating elements.

The side cooling part may include a one side cooling part which is disposed to protrude to one side of the housing in the width direction, and the other side cooling part which is disposed to protrude to the other side of the housing in the width direction.

Further, the side cooling part may include: a collecting part which collects heat from a unit heat-generating element provided on the top surface of the FPGA assembly, a discharging part which is provided with a plurality of cooling ribs which are provided to protrude to one side and the other side of the housing in the width direction, formed lengthily in the longitudinal direction of the housing, and disposed to be spaced at a predetermined distance apart from each other in a vertical direction of the housing, and a heat transfer part which has one end connected to the collecting part and the other end connected to the discharging part to transfer the heat collected by the collecting part to the discharging part.

Further, the collecting part may be in close contact with the top surface of the unit heat-generating element.

Further, the heat transfer part may include: an inner part which is disposed between the housing and the top cooling part, and transfers the heat collected by the collecting part to the top cooling part and an outer part which extends from the inner part, and is inserted into the discharging part to transfer residual heat other than the heat transferred to the top cooling part to the discharging part.

Further, the bottom surface of the top cooling part may be formed with a heat accommodating groove with which a portion of the outer circumferential surface of the inner part is in close contact.

Further, an intermediate portion between the inner part and the outer part may be bent between a boundary of the housing and the top cooling part.

Further, the discharging part may include an inner cooling terminal which is formed with an inserting slot into which the heat transfer part is inserted, and formed so that the plurality of side cooling ribs protrude toward one side surface or the other side surface of the housing and an outer cooling terminal which is formed with a heat accommodating groove, which is provided to be in surface contact with the outer surface of the inner cooling terminal and in which the heat transfer part inserted between the outer cooling terminal and the inner cooling terminal is seated.

Further, the heat transfer part may be composed of a plurality of heat pipe groups whose insides are each filled with a heat transfer fluid.

Advantageous Effects

According to an exemplary embodiment of the multiple-input and multiple-output antenna apparatus according to the present disclosure, it is possible to easily dissipate, to the outside without providing the separate blowing fan, the heat from the plurality of heat-generating elements which are provided in the limited heat-generating space between the housing and the top cooling part, thereby improving the cooling performance.

BEST MODE

Hereinafter, some exemplary embodiments of the present disclosure will be described in detail through exemplary drawings. It should be noted that in adding reference numerals to the components of each drawing, the same components have the same reference numerals as possible even though they are illustrated on different drawings. Further, in describing the present disclosure, when it is determined that detailed descriptions of related publicly-known structures or functions may obscure the subject matter of the present disclosure, detailed descriptions thereof will be omitted.

Throughout the specification, when a part "includes" or "has" a component, it means that the part may further include other components, rather than excluding other components, unless otherwise specified. The term "heat-generating element" used in the specification is a kind of an electric element, and it is natural that the heat-generating element may be replaced with any component as long as it generates a predetermined heat during operation.

Figure 1:
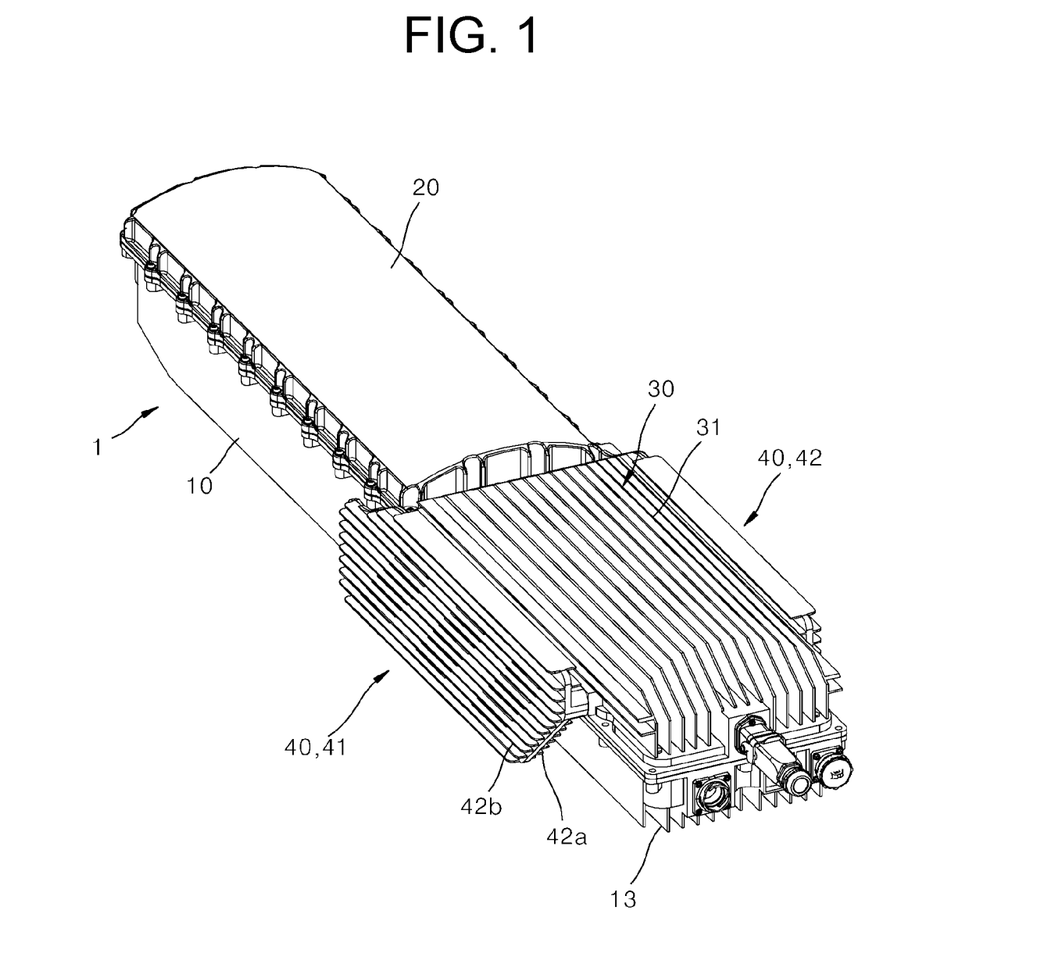
FIG. 1 is a perspective diagram illustrating an exemplary embodiment of a multiple-input and multiple-output antenna apparatus according to the present disclosure.
Figure 2:
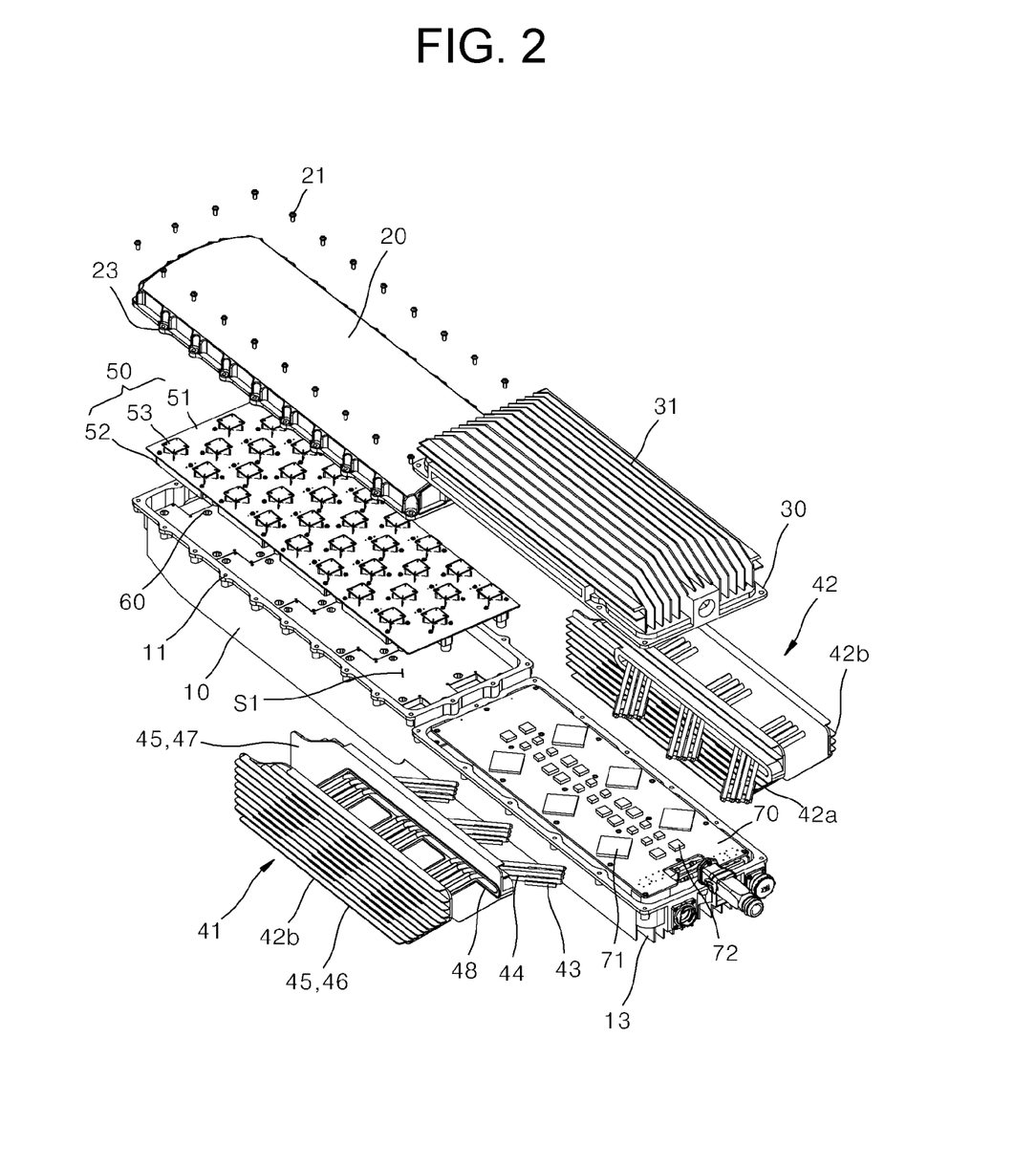
FIG. 2 is an exploded perspective diagram of FIG. 1.
Figure 3:
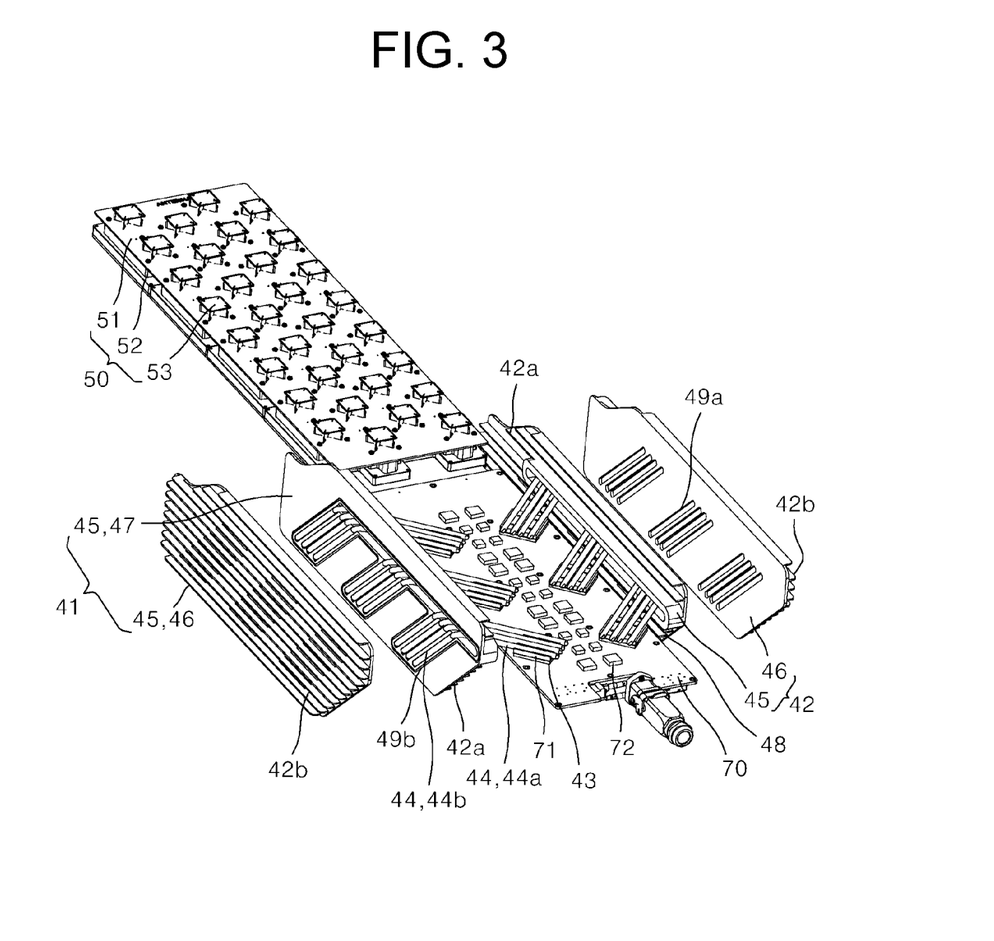
FIG. 3 is a configuration diagram illustrating a cooling state by a side cooling part among the components illustrated in FIG. 1.
Figure 4:
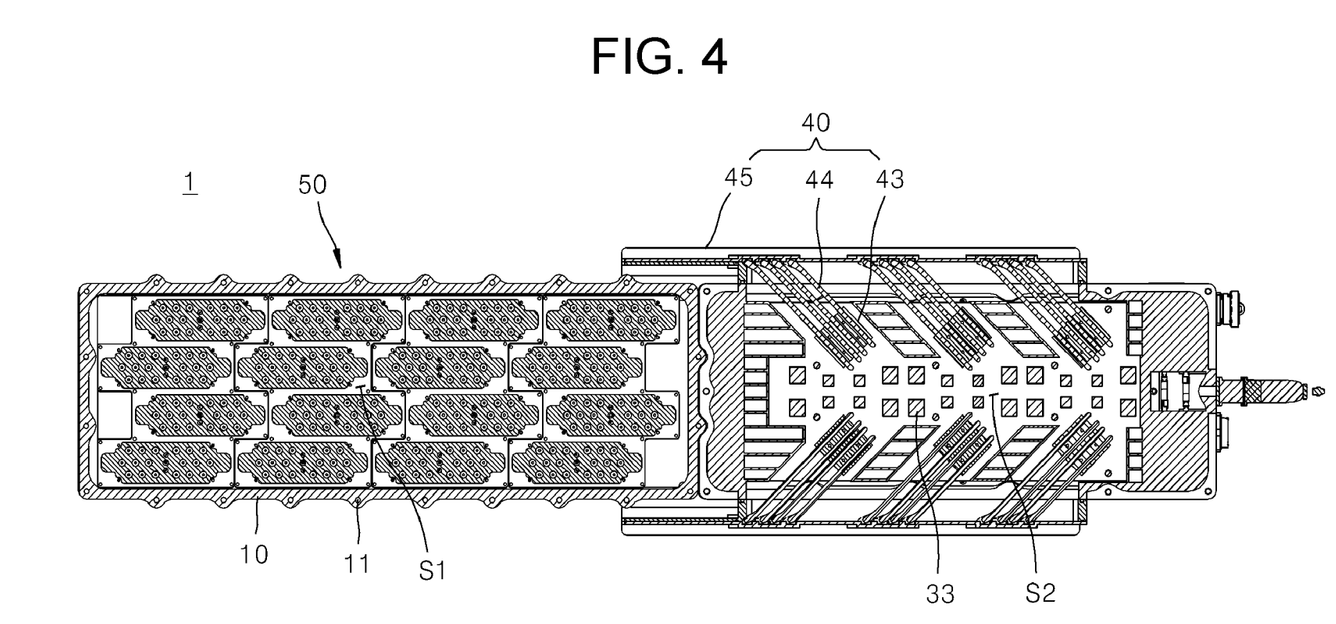
FIG. 4 is a cross-sectional diagram taken along line A-A illustrated in FIG. 1.
Figure 5:
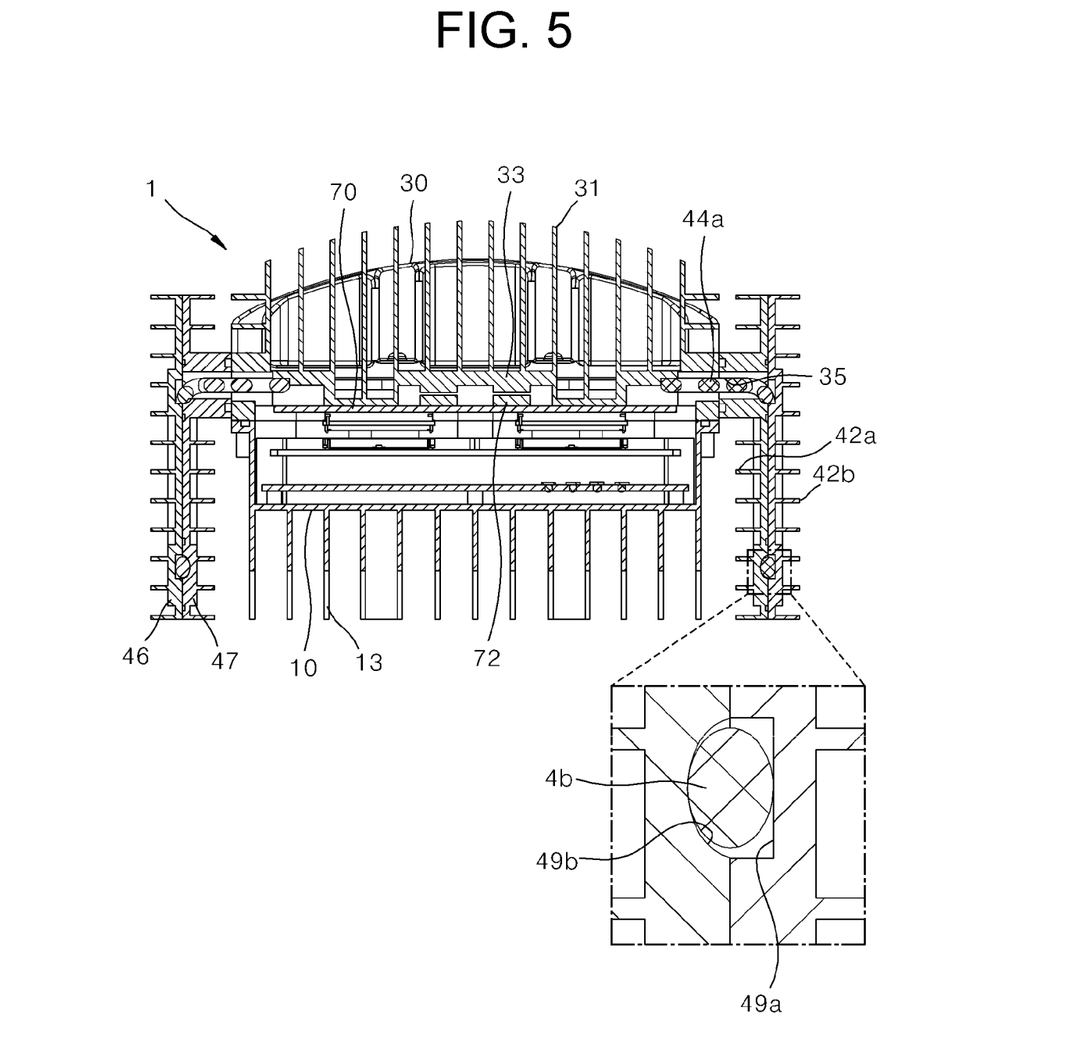
FIG. 5 is a cross-sectional diagram taken along the line B-B illustrated in FIG. 1.
Figure 6:
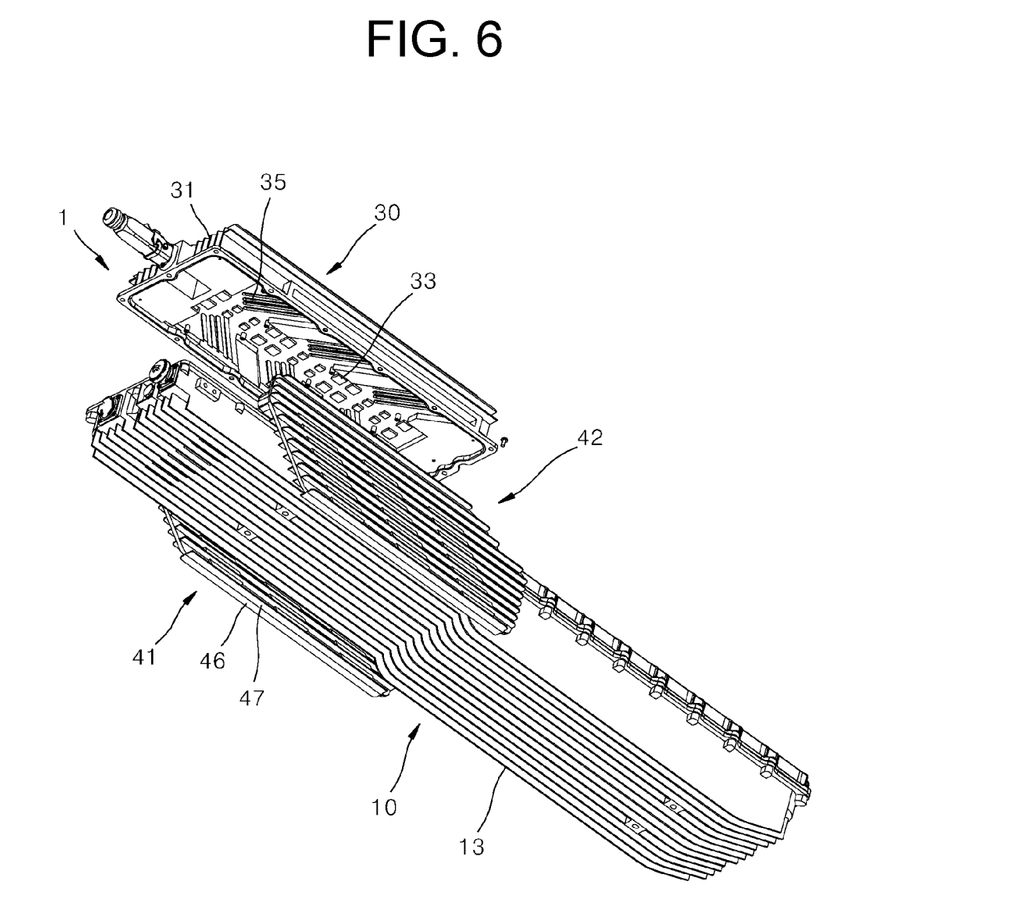
FIG. 6 is an exploded perspective diagram illustrating a cooling state of a top cooling part among the components illustrated in FIG. 1.

FIG. 1 is a perspective diagram illustrating an exemplary embodiment of a multiple-input and multiple-output antenna apparatus according to the present disclosure, FIG. 2 is an exploded perspective diagram of FIG. 1, FIG. 3 is a configuration diagram illustrating a cooling state by a side cooling part among the components illustrated in FIG. 1, FIG. 4 is a cross-sectional diagram taken along line A-A illustrated in FIG. 1, FIG. 5 is a cross-sectional diagram taken along the line B-B illustrated in FIG. 1, and FIG. 6 is an exploded perspective diagram illustrating a cooling state of a top cooling part among the components illustrated in FIG. 1.

An exemplary embodiment of a multiple-input and multiple-output antenna apparatus 1 according to the present disclosure includes a housing 10 which is disposed lengthily in a longitudinal direction, as illustrated in FIGS. 1 to 6.

Here, as illustrated in FIGS. 1 and 2, the housing 10 has a shape with the top opened substantially, and may be formed lengthily from the top left end to the bottom right end in the drawings of FIGS. 1 and 2. Hereinafter, in the drawings of FIGS. 1 and 2, a direction from the top left end to the bottom right end or a direction from the bottom right end to the top left end will be defined as "a longitudinal direction" and a direction orthogonal to the longitudinal direction will be defined as "a width direction".

Further, terms similar to the terms "top", "bottom", "left", and "right", which are terms used to indicate the direction in an exemplary embodiment of the present disclosure, are used to indicate the direction illustrated in the drawings in order to help more clear understanding of an exemplary embodiment of the present disclosure, and the scope of the present disclosure should not be limited by the direction indication terms.

An antenna assembly 50 may be installed on the top surface corresponding to one side of the housing 10 in the longitudinal direction. A radome may be installed on the top of the antenna assembly 50. The radome 20 is disposed to cover the entire antenna assembly 50 which is provided to occupy one side of the housing 10 in the longitudinal direction, and serves to protect the antenna assembly 50 from an external wind pressure.

The radome 20 may be bolt-coupled to the top of the housing 10. To this end, a bolt fastening groove 11 is formed in the rim portion of the housing 10, and a bolt fastening hole 23 is formed in the rim portion of the housing 10, such that a fastening bolt 21 is fastened sequentially to the bolt fastening hole 23 and the bolt fastening groove 11 at the top thereof so that the radome 20 may be coupled to the top of one side of the housing 10.

The housing 10 has a shape with the top opened substantially, and a first installation space S1 in which the antenna assembly 50 is installed may be formed at one side in the longitudinal direction, and a second installation space S2 in which an FPGA assembly (see reference numeral 71) is installed may be formed at the other side in the longitudinal direction.

The antenna assembly 50 includes a printed circuit board (PCB) 51 which is disposed inside the housing 10, a plurality of antenna elements 53 which are installed on the top surface of the printed circuit board 51, and a power supply unit (PSU) 52 which is disposed on the bottom surface of the printed circuit board 51 to supply an operating power to electric components including the plurality of antenna elements 53.

The power supply unit 52 may have a docking protrusion provided on the bottom surface thereof to be dock-installed through a docking hole formed in the inner surface of the housing 10. The heat generated upon the operation of the power supply unit 52 is transferred to the housing 10 through the docking protrusion and the docking hole.

The bottom surface of the housing 10 may be provided with a plurality of bottom cooling ribs 13 which protrude at a predetermined length downward, are formed lengthily in the longitudinal direction of the housing 10, and disposed to be spaced at a predetermined distance apart from each other in the width direction of the housing 10.

Accordingly, when the heat generated from the power supply unit 52 is transferred to the housing 10, the heat may be dissipated to the outside through the plurality of bottom cooling ribs 13, thereby cooling the first installation space S1 provided with the antenna assembly 50.

Meanwhile, the FPGA assembly (see reference numeral 71) is installed in the second installation space S2 of the housing 10 as described above. The FPGA assembly may include an FPGA board (hereinafter, abbreviated as 'an F-board 70') disposed in the second installation space S2, and a plurality of FPGAs 71 and a plurality of DCDC-DTAs 72 which are installed on the top surface of the F-board 70.

Generally, the FPGA 71 and the DCDC-DTA 72 are a type of electric components, and are electric components which require cooling. As illustrated in FIG. 2, the FPGA 71 is disposed adjacent to the edge of the housing 10 in the width direction substantially with respect to the center of the F-board 70, and a plurality of FPGAs 71 may be disposed to be spaced at a predetermined distance apart from each other in an obliquely sloped shape. The DCDC-DTA 72 may be disposed in at least two rows lengthily in the longitudinal direction at the center of the F-board 70 which corresponds to the component located between the plurality of FPGAs 71 disposed at the edges. An exemplary embodiment of the present disclosure adopts that three FPGAs 71 are disposed to be spaced at a predetermined distance apart from each other in the longitudinal direction at the one side in the width direction with respect to the center of the F-board 70, and three FPGAs 71 are disposed to be spaced at a predetermined distance apart from each other in the longitudinal direction at the other side in the width direction with respect to the center of the F-board 70 to be symmetrical to the three FPGAs 71 located at the one side in the width direction. However, according to an exemplary embodiment, it will be natural that the number of FPGAs 71 may be designed to be further increased or decreased.

However, in an exemplary embodiment of the present disclosure, if the first installation space S1 side is located relatively higher than the second installation space S2 side when the MIMO antenna apparatus 1 according to the present disclosure is actually installed, the FPGA 71 may be disposed in an obliquely sloped shape so that the arrangement of a heat transfer part 44 composed of a heat pipe group of a side cooling part 40 to be described later is easily designed. This will be described in more detail later.

As illustrated in FIGS. 1 and 2, an exemplary embodiment of the multiple-input and multiple-output antenna apparatus 1 according to the present disclosure may further include a top cooling part 30 which dissipates upward the heat generated from the FPGA 71 assembly, and the side cooling part 40 which is coupled to protrude to one side in the width direction and the other side in the width direction between the housing 10 and the top cooling part 30, and moves and dissipate the heat generated from the FPGA 71 assembly to one side and the other side.

The top surface of the top cooling part 30 may be provided with a plurality of top cooling ribs 31, which protrude at a predetermined length upward, are formed lengthily in the longitudinal direction of the housing 10, and disposed to be spaced at a predetermined distance apart from each other in the width direction of the housing 10.

Here, the top cooling part 30 serves to induce and dissipate upward some of the heat generated from the unit heat-generating elements such as the FPGA 71 and the DCDC-DTA 72 provided on the F-board 70.

More specifically, as illustrated in FIGS. 5 and 6, a heat contact protrusion 33 which is directly in heat contact with the top surface of the DCDC-DTA 72 of the FPGA 71 and the DCDC-DTA 72 may be formed to protrude downward from the bottom surface of the top cooling part 30. The heat contact protrusion 33 may be designed to be in heat contact with the top surface of the DCDC-DTA 72 when the top cooling part 30 is completely mounted on the top surface of the other side of the housing 10.

Further, the bottom surface of the top cooling part 30 may be formed with a heat contact groove part 35, which is formed to be recessed upward so that a portion of the heat transfer part 44 which induces the heat generated from the FPGA 71 to the aforementioned side cooling part 40 is accommodated and directly in heat contact with the heat contact groove part 35, as will be described later.

Likewise, the heat contact groove part 35 is also preferably designed to be engaged with and in heat contact with the top surface of the heat transfer part 44 when the top cooling part 30 is mounted on the top surface of the other side of the housing 10.

Meanwhile, the side cooling part 40 may include a one side cooling part 41 which is disposed to protrude to one side of the housing 10 in the width direction and the other side cooling part 42 which is disposed to protrude to the other side of the housing 10 in the width direction.

That is, the side cooling part 40 is formed at the other side of the housing 10 in the longitudinal direction, and the one side cooling part 41 and the other cooling part 42 are each provided in a wing shape in the width direction to serve to induce and dissipate to the side the heat generated from the heat-generating elements such as the FPGA 71 and the DCDC-DTA 72 of the other side of the housing 10 in the longitudinal direction.

More specifically, as illustrated in FIGS. 3 and 4, the side cooling part 40 may include a collecting part 43 which collects the heat from the unit heat-generating element provided on the top surface of the FPGA 71 assembly, a discharging part 45 which is provided with a plurality of side cooling ribs 42a, 42b, which are provided to protrude to one side and the other side of the housing 10 in the width direction, are formed lengthily in the longitudinal direction of the housing 10, and are disposed to be spaced at a predetermined distance apart from each other vertically from the housing 10, and the heat transfer part 44 which has one end connected to the collecting part 43 and the other end connected to the discharging part 45 to transfer the heat collected by the collecting part 43 to the discharging part 45.

Particularly, the collecting part 43 may have the bottom surface disposed to be in thermal contact with the top surfaces of the plurality of FPGAs 71 to be in close contact therewith, respectively, and the top surface disposed to be in thermal contact with the outer circumferential surface of the bottom of the heat transfer part 44 in a half-inserted state so that the outer circumferential surface of the bottom of the aforementioned heat transfer part 44 composed of the plurality of heat pipe groups is accommodated. This is to improve the heat contact area of each of the heat pipe with the collecting part 43. The inside of the heat transfer part 44 composed of the plurality of heat pipe groups may be filled with a heat transfer fluid. The heat transfer fluid serves to be instantaneously evaporated to quickly transfer the heat to the other side when the heat is transferred from one side of the heat pipe.

Meanwhile, as described above, the outer circumferential surface of the top of the aforementioned heat transfer part 44 composed of the plurality of heat pipe groups is engaged with and in contact with the heat contact groove part 35 provided on the bottom surface of the top cooling part 30 to complete close the plurality of heat pipe groups, such that the heat transferred through the heat transfer part 44 is prevented from being transferred again into the second installation space S2.

Further, the collecting part 43 may be disposed to correspond to the configuration that the plurality of FPGAs are disposed to be spaced at a predetermined distance apart from each other in the obliquely sloped shape on the F-board 70.

More specifically, the collecting part 43 may be provided in the form of a heat contact plate having an area sufficient to cover the top surface of the FPGA 71, and one end of the heat transfer part 44 composed of the plurality of heat pipe groups may be disposed on the top surface of the collecting part 43 in the half-inserted state, and may be disposed to be sloped to one side of the housing 10 in the width direction so that the heat transfer fluid filling the inside of the heat pipe group easily flows upward naturally while being vaporized.

Accordingly, when the heat transfer fluid is vaporized by the heat collected from one end of the heat transfer unit 44, the vaporized heat transfer fluid may naturally flow toward the other end of the heat transfer part 44 if the other end of the heat transfer part 44 is located relatively higher the one end thereof, thereby improving the heat transfer efficiency.

As illustrated in FIGS. 3 and 4, an exemplary embodiment of the present disclosure adopts that the heat transfer part 44 composed of four heat pipe groups is disposed in parallel to be spaced at a predetermined distance apart from the top surface of one collecting part 43.

Meanwhile, as illustrated in FIG. 3, the heat transfer part 44 may include an inner part 44a which is disposed between the housing 10 and the top cooling part 30, and transfers the heat collected by the collecting part 43 to the top cooling part 30 or the side cooling part 40, and an outer part 44b which extends from the inner part 44a, and is inserted into the discharging part 45 to transfer residual heat other than the heat transferred to the top cooling part 30 to the discharging part 45.

More specifically, the heat generated from the FPGA 71 which is the unit heat-generating element is collected by the collecting part 43 and then transferred to the inner part 44a of the heat transfer part 44 composed of four heat pipe groups. Here, as illustrated in FIG. 6, the inner part 44a has the outer circumferential surface of the top accommodated in and in heat contact with the heat contact groove part 35 formed on the bottom surface of the top cooling part 30, and thus transfers and dissipates some of the heat transferred from the collecting part 43 to the top cooling part 30 through the directly contacted heat contact groove part 35. The residual heat other than the heat transferred to the top cooling part 30 is transferred to the outer part 44b of the heat transfer part 44 and then dissipated to one side or the other side of the housing 10 in the width direction through the discharging part 45.

Meanwhile, a boundary portion between the inner part 44a and the outer part 44b may be formed to be bent between the boundary of the housing 10 and the top cooling part 30. Here, the outer part 44b may be disposed to be downward sloped forward or backward so that the heat contact area with the discharging part 45 is increased.

As described above, the outer part 44b is disposed to be downward sloped forward or backward with respect to the inner part 44a, which makes it possible to provide an advantage capable of compactly designing the vertical height of the discharging part 45 without lengthily designing the vertical height of the discharging part 45.

The vertical height of the discharging part 45 is preferably formed to be substantially smaller than the height obtained by summing the other side of the housing 10 in the longitudinal direction and the top side cooling part 30.

Meanwhile, the discharge part 45 may include an inner cooling terminal 47 which is formed with an inserting slot 48 into which the heat transfer part 44 is inserted, and has the plurality of side cooling ribs formed to protrude toward one side surface or the other side surface of the housing 10, and an outer cooling terminal 46 which is formed with a heat accommodating groove which is provided to be in surface contact with the outer surface of the inner cooling terminal 47 and in which the heat transfer part 44 inserted between the outer cooling terminal 46 and the inner cooling terminal 47 is seated.

Here, the inserting slot 48 is a portion provided with the inner part 44a and the outer part 44b of the heat transfer part 44 described above, and is a portion into which the inner part 44a is inserted before being bent. The inserting slot 48 may be formed lengthily in front of and behind the inner cooling terminal 47 so that all of the plurality of heat transfer parts 44 composed of four heat pipe groups are inserted.

Meanwhile, as described above, the outer surface of the inner cooling terminal 47 and the inner surface of the outer cooling terminal 46 may be formed with an inner heat accommodating groove 49b and an outer heat accommodating groove 49a, in which a portion of the outer circumferential surface of the outer part 44b of the heat transfer part 44, which extends outward through the inserting slot 48 and then is bent to be disposed to be downward sloped forward or backward, is matched and accommodated, respectively.

Here, the outer surface of the inner cooling terminal 47 and the inner surface of the outer cooling terminal 46 may be provided so that the entire remaining portion other than the inner heat accommodating groove 49b and the outer heat accommodating groove 49a described above is in surface contact with each other.

The inner surface of the inner cooling terminal 47 may be provided with the plurality of inner cooling ribs 42a, which are disposed to be spaced at a predetermined distance apart from the side surface of the housing 10, formed to protrude toward one side surface and the other surface of the housing 10 into the separated space, and formed in plural lengthily in the longitudinal direction of the housing 10.

Conversely, the outer surface of the outer cooling terminal 46 may be provided with the plurality of outer cooling ribs 42b, which are formed to protrude outward and formed in plural lengthily in the longitudinal direction of the housing 10.

The outer part 44b of the heat transfer part 44 located between the inner cooling terminal 47 and the outer cooling terminal 46 has half of the outer circumferential surface accommodated in the inner heat accommodating groove 49b and the other half of the outer circumferential surface accommodated in the outer heat accommodating groove 49a, and the outer surface of the inner cooling terminal 47 and the inner surface of the outer cooling terminal 46 are in surface contact with each other, such that the heat generated from the FPGA 71 may be induced and dissipated to the discharging part 45 by the heat transfer part 44.

Accordingly, even if a separate blowing fan is not provided inside the second installation space S2, there is an advantage capable of dissipating the heat generated from the unit heat-generating element, which constructs the multi-input and multiple-output (MIMO) antenna system, with high cooling performance.

An operating state of the multiple-input and multiple-output antenna apparatus 1 according to an exemplary embodiment of the present disclosure configured as described above will be briefly described as follows.

First, the heat generated from the antenna assembly 50 (particularly, the power supply unit (PSU) 52) provided in the first installation space S1 is directly and transferred through the housing 10 coupled in the docking type and then dissipated to the outside through the plurality of bottom cooling ribs 13 provided at the outside.

Next, in the case of the DCDC-DTA 72, the heat generated from the plurality of unit heat-generating elements provided in the second installation space S2 is directly and transferred to the top cooling part 30 by the heat contact protrusion 33 of the top cooling part 30 and then dissipated to the outside through the plurality of top cooling ribs 31 provided at the outside, and in the case of the FPGA 71, during the process in which heat is collected by the collecting part 43 among the components of the side cooling part 40, respectively and then transferred to the discharging part 45 through the heat transfer part 44, some heat is dissipated by the top cooling part 30 through the heat contact groove part 35 of the top cooling part 30, and the residual heat is transferred to the discharging part 45 through the heat transfer part 44 and then dissipated to the outside through the plurality of inner cooling ribs 42a and the plurality of outer cooling ribs 42b.

As described above, according to an exemplary embodiment of the multiple-input and multiple-output antenna apparatus 1 according to the present disclosure, by increasing the number of antennas, it is possible to induce the heat transfer to the outside from the fixed point at which the heat is directly generated, thereby maximizing cooling performance.

The exemplary embodiments of the multiple-input and multiple-output antenna apparatus according to the present disclosure have been described above in detail with reference to the accompanying drawings. However, it will be natural that exemplary embodiments of the present disclosure are not limited by the aforementioned exemplary embodiments, and the present disclosure can be variously modified and carried out within the equivalent scope by those skilled in the art to which the present disclosure pertains. Accordingly, the true scope of the present disclosure will be defined by the claims to be described later.

INDUSTRIAL APPLICABILITY

The present disclosure provides the multiple-input and multiple-output antenna apparatus capable of improving cooling performance of the heat generated from the plurality of heat-generating elements.

The invention claimed is:

1. A multiple-input and multiple-output antenna apparatus comprising:
   a housing;
   a radome which is coupled to the top of one side of the housing in a longitudinal direction, and has an antenna assembly disposed between the radome and the housing;
   a PCB assembly which is disposed at the bottom of the antenna assembly;
   a top cooling part which is coupled to the top of the other side of the housing in the longitudinal direction, has a battery and an FPGA assembly disposed between the top cooling part and the housing, and dissipates upward the heat discharged from the FPGA assembly; and
   a side cooling part which is coupled to protrude to one side in a width direction between the housing and the top cooling part and the other side in the width direction therebetween, and transfers and dissipates the heat generated from the FPGA assembly to one side and the other side of the housing in the width direction,
   wherein the side cooling part comprises:
   a collecting part which collects heat from a unit heat-generating element provided on the top surface of the FPGA assembly;
   a discharging part which is provided with a plurality of side cooling ribs which are provided to protrude to one side and the other side of the housing in the width direction, formed lengthily in the longitudinal direction of the housing, and disposed to be spaced at a predetermined distance apart from each other in a vertical direction of the housing; and
   a heat transfer part which has one end connected to the collecting part and the other end connected to the discharging part to transfer the heat collected by the collecting part to the discharging part,
   wherein the discharging part comprises an upper discharging part which branches from the other end of the heat transfer part upwardly and a lower discharging part which branches from the other end of the heat transfer part downwardly.

2. The multiple-input and multiple-output antenna apparatus of claim 1, wherein the bottom surface of the housing is provided with a plurality of bottom cooling ribs, which protrude at a predetermined length downward, are formed lengthily in the longitudinal direction of the housing, and are disposed to be spaced at a predetermined distance apart from each other in the width direction of the housing.

3. The multiple-input and multiple-output antenna apparatus of claim 1,
wherein the top surface of the top cooling part is provided with a plurality of top cooling ribs, which protrude at a predetermined length upward, are formed lengthily in the longitudinal direction of the housing, and are disposed to be spaced at a predetermined distance apart from each other in the width direction of the housing.

4. The multiple-input and multiple-output antenna apparatus of claim 1,
wherein the side cooling part comprises a one side cooling part which is disposed to protrude to one side of the housing in the width direction, and the other side cooling part which is disposed to protrude to the other side of the housing in the width direction.

5. The multiple-input and multiple-output antenna apparatus of claim 1,
wherein the collecting part is in close contact with the top surface of the unit heat-generating element.

6. The multiple-input and multiple-output antenna apparatus of claim 5, wherein the heat transfer part is composed of a plurality of heat pipe groups whose insides are each filled with a heat transfer fluid.

7. The multiple-input and multiple-output antenna apparatus of claim 1,
wherein the heat transfer part comprises:
an inner part which is disposed between the housing and the top cooling part, and transfers the heat collected by the collecting part to the top cooling part; and
an outer part which extends from the inner part, and is inserted into the discharging part to transfer residual heat other than the heat transferred to the top cooling part to the discharging part.

8. The multiple-input and multiple-output antenna apparatus of claim 7,
wherein the bottom surface of the top cooling part is formed with a heat contact groove part with which a portion of the outer circumferential surface of the inner part is in close contact.

9. The multiple-input and multiple-output antenna apparatus of claim 8, wherein the heat transfer part is composed of a plurality of heat pipe groups whose insides are each filled with a heat transfer fluid.

10. The multiple-input and multiple-output antenna apparatus of claim 7,
wherein a boundary portion between the inner part and the outer part is bent between a boundary of the housing and the top cooling part.

11. The multiple-input and multiple-output antenna apparatus of claim 10, wherein the heat transfer part is composed of a plurality of heat pipe groups whose insides are each filled with a heat transfer fluid.

12. The multiple-input and multiple-output antenna apparatus of claim 7, wherein the heat transfer part is composed of a plurality of heat pipe groups whose insides are each filled with a heat transfer fluid.

13. The multiple-input and multiple-output antenna apparatus of claim 1, wherein the heat transfer part is composed of a plurality of heat pipe groups whose insides are each filled with a heat transfer fluid.

14. A multiple-input and multiple-output antenna apparatus comprising:
a housing;
a radome which is coupled to the top of one side of the housing in a longitudinal direction, and has an antenna assembly disposed between the radome and the housing;
a PCB assembly which is disposed at the bottom of the antenna assembly;
a top cooling part which is coupled to the top of the other side of the housing in the longitudinal direction, has a battery and an FPGA assembly disposed between the top cooling part and the housing, and dissipates upward the heat discharged from the FPGA assembly; and
a side cooling part which is coupled to protrude to one side in a width direction between the housing and the top cooling part and the other side in the width direction therebetween, and transfers and dissipates the heat generated from the FPGA assembly to one side and the other side of the housing in the width direction,
wherein the side cooling part comprises:
a collecting part which collects heat from a unit heat-generating element provided on the top surface of the FPGA assembly;
a discharging part which is provided with a plurality of side cooling ribs which are provided to protrude to one side and the other side of the housing in the width direction, formed lengthily in the longitudinal direction of the housing, and disposed to be spaced at a predetermined distance apart from each other in a vertical direction of the housing; and
a heat transfer part which has one end connected to the collecting part and the other end connected to the discharging part to transfer the heat collected by the collecting part to the discharging part,
wherein the discharging part comprises:
an inner cooling terminal which is formed with an inserting slot into which the heat transfer part is inserted, and formed so that the plurality of side cooling ribs protrude toward one side surface or the other side surface of the housing; and
an outer cooling terminal which is formed with a heat accommodating groove, which is provided to be in surface contact with the outer surface of the inner cooling terminal and in which the heat transfer part inserted between the outer cooling terminal and the inner cooling terminal is seated.

15. The multiple-input and multiple-output antenna apparatus of claim 14, wherein the heat transfer part is composed of a plurality of heat pipe groups whose insides are each filled with a heat transfer fluid.

* * * * *